US009192222B2

(12) United States Patent
Nashimoto et al.

(10) Patent No.: US 9,192,222 B2
(45) Date of Patent: Nov. 24, 2015

(54) BACKPACK WORK MACHINE

(71) Applicant: MAKITA CORPORATION, Aichi (JP)

(72) Inventors: Tomonobu Nashimoto, Aichi (JP);
Takuro Konishi, Aichi (JP); Ryouichi Shimooka, Aichi (JP); Motonobu Ishikawa, Aichi (JP)

(73) Assignee: MAKITA CORPORATION, Aichi (JP)

( * ) Notice: Subject to any disclaimer, the term of this patent is extended or adjusted under 35 U.S.C. 154(b) by 0 days.

(21) Appl. No.: 14/476,887

(22) Filed: Sep. 4, 2014

(65) Prior Publication Data
US 2015/0113758 A1  Apr. 30, 2015

(30) Foreign Application Priority Data
Oct. 25, 2013  (JP) .................................. 2013-222793

(51) Int. Cl.
A47L 5/36 (2006.01)
A45F 3/08 (2006.01)

(52) U.S. Cl.
CPC ........................ *A45F 3/08* (2013.01)

(58) Field of Classification Search
CPC .................................. A47L 5/36; A47L 5/14
See application file for complete search history.

(56) References Cited

U.S. PATENT DOCUMENTS

| 5,813,088 | A  | * | 9/1998 | Wagner et al. | 15/327.5 |
| 5,873,284 | A  | * | 2/1999 | Stegall et al. | 74/525 |
| 6,431,024 | B1 | * | 8/2002 | Yuasa et al. | 74/519 |
| 7,600,290 | B1 | * | 10/2009 | Peters | 15/327.5 |
| 8,177,914 | B2 | * | 5/2012 | Peters | 134/25.1 |
| 8,671,516 | B1 | * | 3/2014 | Mendez | 15/405 |

FOREIGN PATENT DOCUMENTS

JP  10-299503  11/1998

* cited by examiner

*Primary Examiner* — Dung Van Nguyen
(74) *Attorney, Agent, or Firm* — Greenblum & Bernstein, P.L.C.

(57) ABSTRACT

A backpack work machine is provided and may include a backpack frame, a motor mounted on the backpack frame, a driven device driven by the motor, and an arm provided at a lower portion of the backpack frame. The arm is rotatable around an axis line that extends in a left-right direction of the backpack frame and has in a fore end portion thereof a throttle lever regulating output of the motor. The backpack frame also has in the lower portion thereof a support axis having an axis line, and the arm is supported by the support axis so as to be rotatable around the axis line of the support axis within a rotation range that extends between an up-down direction of the backpack frame and a front-rear direction of the backpack frame.

20 Claims, 5 Drawing Sheets

BACKPACK WORK MACHINE

CROSS-REFERENCE TO RELATED APPLICATIONS

The present application claims priority under 35 U.S.C. §119 of Japanese Application No. 2013-222793 filed on Oct. 25, 2013, the disclosure of which is expressly incorporated by reference herein in its entirety.

BACKGROUND OF THE INVENTION

1. Field of the Invention

The present invention relates to a backpack work machine that a worker carries on the back for use. Specifically, the present invention relates to a backpack work machine having a motor mounted on a backpack frame that a worker carries on the back and a throttle lever provided to a fore end portion of an arm provided to a lower portion of the backpack frame, the throttle lever regulating output of the motor.

2. Description of Related Art

Japanese Patent Laid-Open Publication No. H10-299503 discloses a backpack blower having a blower unit that blows out air and is mounted on a backpack frame. In this backpack blower, the blower unit driven by an engine is mounted on the backpack frame that a worker carries on the back and air is discharged from a blower tube extending from a blowout duct of the blower unit. This backpack blower has an arm supported in a left side portion of the backpack frame, the arm being rotatable around a horizontal axis line of a left-right direction in a lower front portion. A throttle lever regulating output of the engine is provided to a fore end portion of the arm.

When using this backpack blower, a worker operates a grip handle of the blower tube with the right hand such that air discharged from a fore end opening of the blower tube is directed to fallen leaves scattered on the ground, and concurrently holds a grip in the fore end portion of the arm with the left hand and operates the throttle lever with the fingers so as to control an air volume discharged from the blower tube.

In the backpack blower of Japanese Patent Laid-Open Publication No. H10-299503, the arm is supported in the lower front portion of the left side portion of the backpack frame so as to be rotatable around the horizontal axis line of the left-right direction. When using the backpack blower, the worker rotates the arm from a position extending perpendicularly upward to a position extending forward, and holds the grip in the fore end portion of the arm in front of himself/herself with the left hand and operates the throttle lever with the fingers. In a state, however, where the arm is positioned in front of the body, the worker must hold the arm while closing off the left side of the body, thus getting tired from holding the arm in some cases. With the grip in the fore end portion of the arm positioned outward from the body, the worker can hold the grip of the arm in a position comfortable for the left hand without closing off the left side of the body. To this end, a coil spring is provided between the grip in the fore end portion and a pipe member in a base end portion of the arm. A portion where the coil spring is provided is freely deformable in a direction orthogonal to a longitudinal direction. Bending the coil spring allows the grip of the arm to be positioned outward from the body to some extent. However, the coil spring cannot be bent sufficiently to allow the left hand to be in a comfortable position.

In addition, the throttle lever in the fore end portion of the arm is a projection smaller than the grip in the fore end portion, the projection being rotated around the horizontal axis line of the left-right direction. Thus, the throttle lever is difficult to rotate. Furthermore, in a state of holding the grip of the arm, the worker can operate the throttle lever only with the thumb of the left hand. Thus, the worker tends to feel tired in the thumb of the left hand when performing the same operation for a long time.

SUMMARY OF THE INVENTION

In view of the above, the present invention provides a backpack work machine, such as a backpack blower, that allows easy use of an arm provided to a lower portion of a backpack frame and having a throttle lever in a fore end portion thereof to regulate output of a motor.

An aspect of the present invention provides a backpack work machine including a backpack frame carried on a back of a worker; a motor mounted on the backpack frame; a driven device driven by the motor; and an arm provided to a lower portion of the backpack frame so as to be rotatable around an axis line of a left-right direction and having in a fore end portion a throttle lever regulating output of the motor. The backpack frame has in the lower portion a support axis having an axis line direction range from an up-down direction to a front-rear direction, and the arm is supported by the support axis so as to be rotatable around the axis line of the support axis.

In the backpack blower having the configuration above, the backpack frame has in the lower portion the support axis having the axis line direction range from the up-down direction to the front-rear direction, and the arm is supported by the support axis so as to be rotatable around the axis line thereof. Thus, the worker can rotate the arm outward from the backpack frame and hold the arm in a comfortable posture.

In the backpack work machine having the configuration above, the support axis is preferably provided at a predetermined angle obliquely rearward from a perpendicular direction. In a case where the support axis is provided perpendicularly, the fore end portion of the arm is proximate to the axis line of the support axis when the arm is perpendicularly upward in a retracted position. Thus, the arm is difficult to rotate around the axis line of the support axis unless the arm is rotated forward such that the fore end portion of the arm is brought away from the axis line of the support axis. Accordingly, two rotation operations are required. With the support axis provided at the predetermined angle obliquely rearward from the perpendicular direction, the fore end portion of the arm is positioned somewhat away from the axis line of the support axis when the arm is perpendicularly upward in the retracted position. Thus, the arm can be rotated in one operation to a forward and outside position that allows easy operation. In this case, the support axis is preferably provided at an angle in a range from 30° to 60°, more preferably from 40° to 50°, obliquely rearward from the perpendicular direction.

In the backpack work machine having the configuration above, the arm is preferably supported by the support axis so as to be rotatable between a backpack frame side and an outer side away from the backpack frame, and a spring member is preferably provided to the lower portion of the backpack frame, the spring member urging the arm toward the backpack frame. Thus, when the backpack work machine is not in use, the arm can be stowed along the backpack frame and can be stored compactly in a storage location.

In the backpack work machine having the configuration above, the arm is preferably rotatably supported by the support axis via an anti-vibration member composed of a flexible elastic member. This prevents vibration generated by the motor from being transmitted to the aria. Thus, the worker becomes less tired from holding the arm.

In the backpack work machine having the configuration above, the throttle lever is preferably a block-shaped body supported so as to be rotatable around a horizontal axis line in the fore end portion of the arm, and a width of the throttle lever in the up-down direction is preferably in a range from 40% to 80%, more preferably from 60% to 70%, of a width of the fore end portion of the arm in the up-down direction. Thus, the worker can rotate the throttle lever while holding the fore end portion of the arm in various ways, such as, for example, rotating the throttle lever while pressing the flat of the thumb against a front surface, rotating the throttle lever while holding it between the thumb and index finger, and rotating the throttle lever with the palm while holding the fore end portion of the arm with the fingers. Accordingly, operation performance of the throttle lever is improved.

In the backpack work machine having the configuration above, a front surface of the throttle lever preferably has a curved shape on the fore end bulging toward a central portion of the up-down direction. Furthermore, the front surface of the throttle lever preferably has a curved shape on the fore end bulging toward the central portion from left and right sides. Thus, when the throttle lever is rotated with the palm while the arm is held with the fingers, fit of the throttle lever to the palm is excellent.

In the backpack work machine having the configuration above, at least one of an upper surface and a lower surface of the throttle lever preferably has a curved shape depressed inward. Thus, when the upper surface of the throttle lever is pressed downward with the thumb or when the lower surface is pressed upward with the index finger, grip of the throttle lever is excellent and thus the operation performance is improved. Furthermore, at least one of the upper surface and the lower surface of the throttle lever preferably may have an anti-slip uneven portion. Thus, the throttle lever has even better grip and the operation performance is improved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
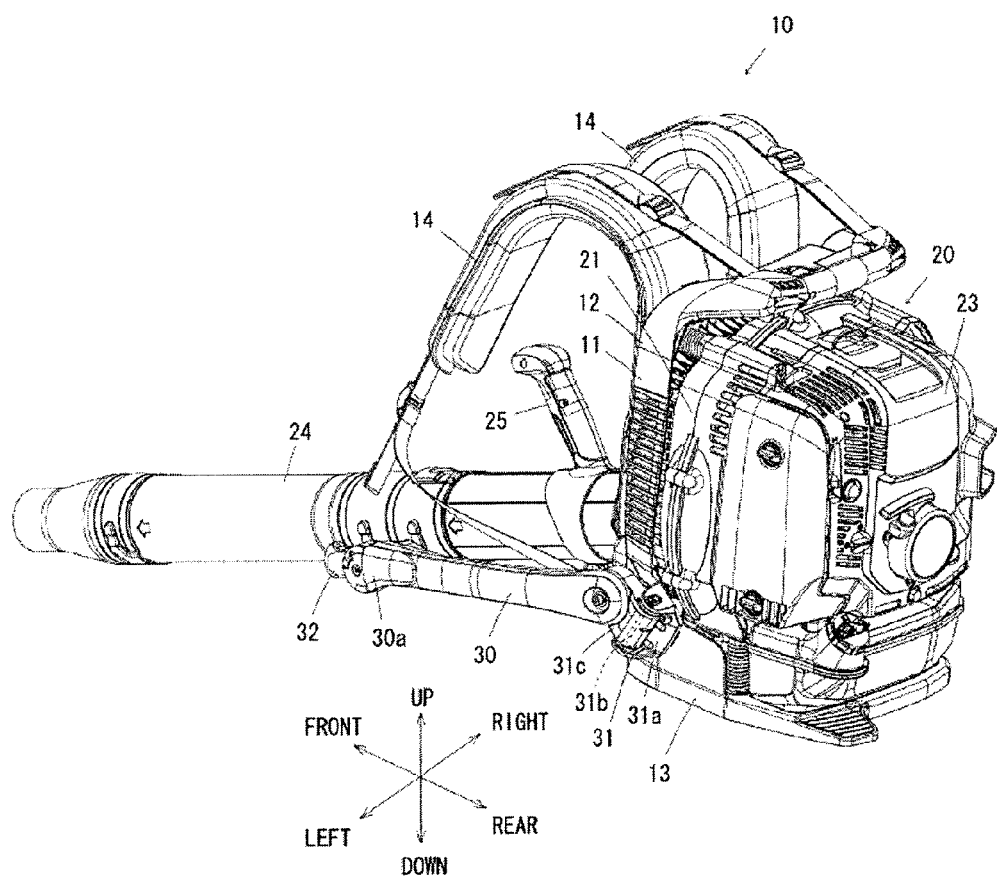
FIG. 1 is a perspective view from obliquely rearward of a backpack blower according to an embodiment of a backpack work machine of the present invention.

A backpack blower according to an embodiment of a backpack work machine of the present invention is described below with reference to the attached drawings. With reference to FIG. 1, a backpack blower 10 has a backpack frame 11, which a worker carries on the back. A blower unit (driven device) 20 driven by an engine (motor) 23 is mounted on the backpack frame 11. A blower tube 24 discharging air extends from a blowout duct 21a of the blower unit 20. An arm 30 is attached to a lower portion of the backpack frame 11.

Figure 2:
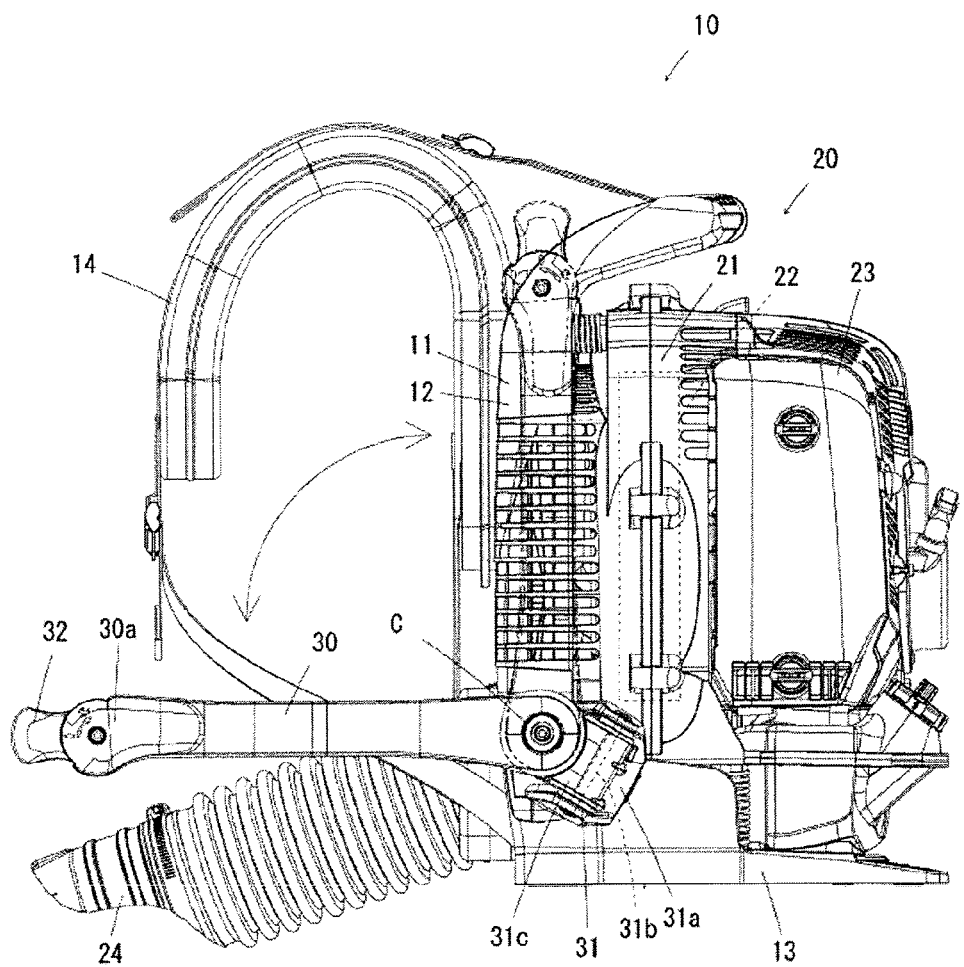
FIG. 2 is a side view of FIG. 1.

With reference to FIGS. 1 and 2, the backpack frame 11 allows the worker to carry the blower unit 20 on the back. The backpack frame 11 has a back plate 12 provided along the back of the worker and a base 13 extending rearward from a lower end of the back plate 12. The backpack frame 11 has an L shape from a side view. The backpack frame 11 has a left and right pair of shoulder straps 14 that the worker carries over the shoulders.

Figure 4A:
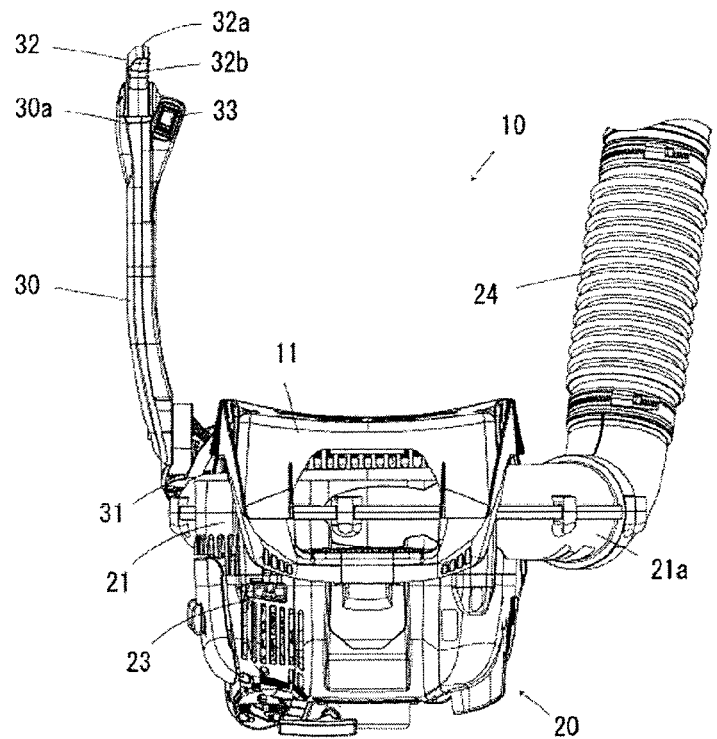
FIG. 4(a) is a plan view of FIG. 1 in a state where the arm is not open outward.
Figure 4B:
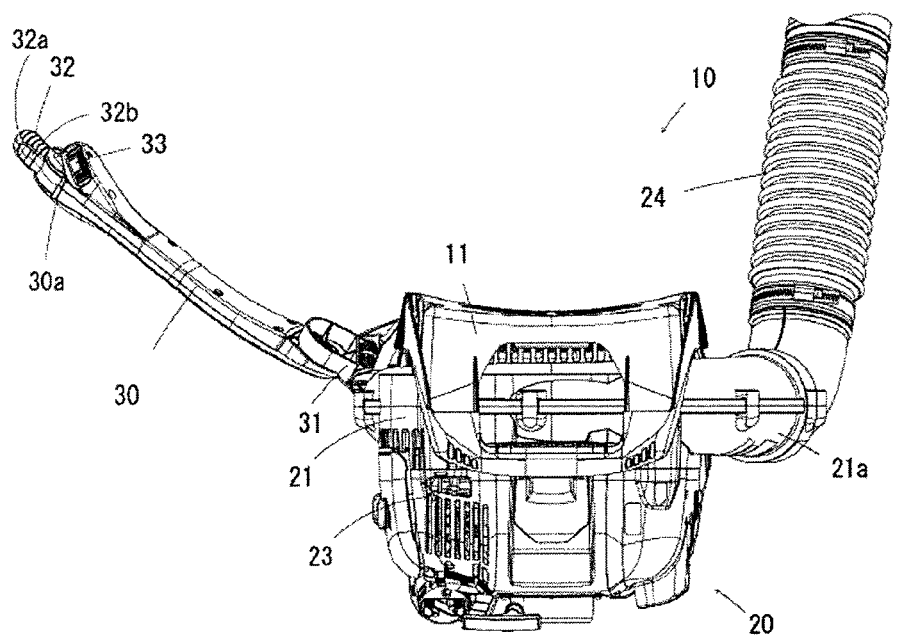
FIG. 4(b) is a plan view of FIG. 1 in a state where the arm is open outward.

With reference to FIGS. 1 and 2, the blower unit 20 is mounted on the base 13. The blower unit 20 has a volute case 21; a fan 22 rotatably supported in the volute case 21; and the engine 23 assembled integrally with the volute case 21 and rotationally driving the fan 22. With reference to FIGS. 4(a) and 4(b), the blowout duct 21a blowing out external air taken in from an air inlet in the front is integrally provided to a right side portion of the volute case 21. The blower tube 24 extends from the blowout duct 21a. The blower tube 24 has a grip handle 25 which the worker holds.

Figure 3A:
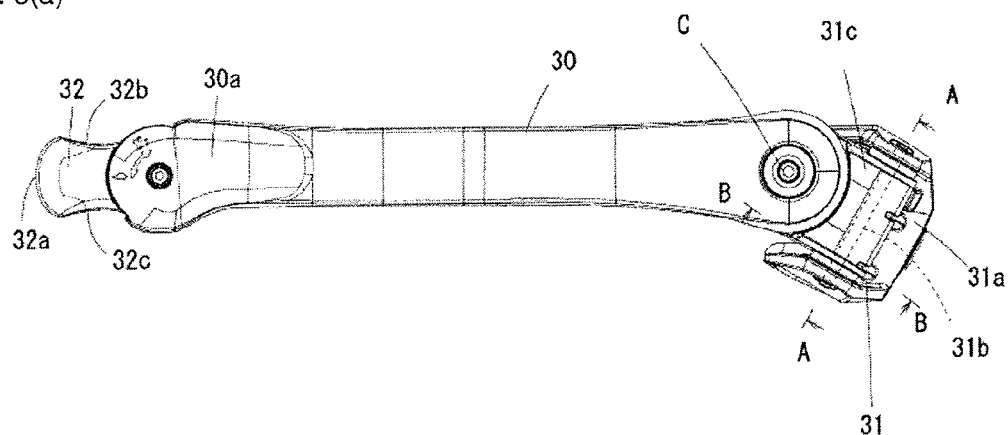
FIG. 3(a) is a side view of an arm.
Figure 3B:
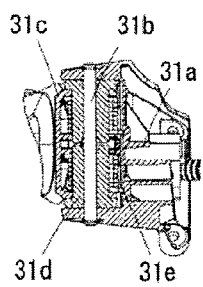
FIG. 3(b) is a cross-sectional view along line A-A of FIG. 3(a)
Figure 3C:
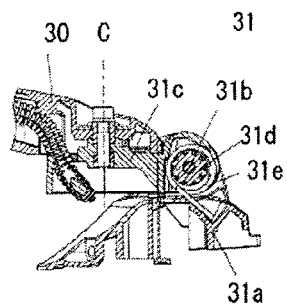
FIG. 3(c) is a cross-sectional view along line B-B of FIG. 3(a)

With reference to FIGS. 1 and 2, the arm 30 is attached to a lower front portion of a left side portion of the backpack frame 11. With reference to FIGS. 3(a) to 3(c), the arm 30 is attached to the backpack frame 11 via a hinge 31. The hinge 31 includes a stationary portion 31a fixated to the backpack frame 11; a support axis 31b attached to the stationary portion 31a; and a movable portion 31c rotatably supported by the support axis 31b and having a base of the arm 30 fixated thereto. With the hinge 31, the arm 30 is rotatable by 90° to the left with respect to a front-rear direction.

The support axis 31b substantially rotatably supports the arm 30. The support axis 31b is attached to the stationary portion 31a so as to have an axis line direction in an up-down direction. With reference to FIG. 2, the support axis 31b is attached at a predetermined angle of 45° obliquely rearward from a perpendicular direction. Although the support axis 31b is provided at 45° obliquely rearward from the perpendicular direction, the angle is not limited to 45° and may be in a range from 30° to 60°, preferably from 40° to 50°.

With reference to FIG. 3(b), an anti-vibration member 31d is provided between the support axis 31b and the movable portion 31c, the anti-vibration member 31d having a sleeve shape and being composed of a flexible elastic member, such as a rubber. The movable portion 31c is supported by the support axis 31b via the anti-vibration member 31d. With reference to FIGS. 3(b) and 3(c), a torsion spring (spring member) 31*e* is provided on an outer periphery of the anti-vibration member 31*d*. The movable portion 31*c* is urged toward the backpack frame 11 (inward) by the torsion spring 31*e*. Similarly, the arm 30, which is supported by the movable portion 31*c*, is also urged toward the backpack frame 11 by the torsion spring 31*e*.

The arm 30 is supported at the base by the movable portion 31*c* of the hinge 31 so as to be rotatable around the horizontal axis line of the left-right direction, centered on a pivot point C. The fore end portion of the arm 30 is a grip 30*a* held by the worker. A width (widest) of the grip 30*a* in the up-down direction is 40 mm to allow an easy grip for the worker. The width of the grip 30*a* in the up-down direction of the grip 30*a* may be in a range from 30 mm to 60 mm, which allows an easy grip for the worker.

A throttle lever 32 is provided to a fore end of the grip 30*a* of the arm 30. The throttle lever 32 regulates throttle valve lift of the engine 23 with a throttle wire to regulate output of the engine 23. The throttle lever 32 is supported in the fore end portion of the arm 30 so as to be rotatable around the horizontal axis line of the left-right direction. Rotating the throttle lever 32 upward increases the output of the engine 23 while rotating the throttle lever 32 downward decreases the output of the engine 23.

With reference to FIGS. 3(*a*) to 3(*c*), the throttle lever 32 is a block-shaped body larger than a conventional throttle lever described in Description of Related Art. A width (widest) of the throttle lever 32 in the up-down direction is 25 mm, which is 62% of the width of the grip 30*a* in the fore end portion of the arm 30 in the up-down direction. Operation performance of the throttle lever 32 improves when the width of the throttle lever 32 in the up-down direction is within a range from 40% to 80%, preferably from 60% to 70%, of the width of the grip 30*a* in the up-down direction. As described above, the height of the grip 30*a* in the up-down direction is 40 mm. Thus, the width of the throttle lever 32 in the up-down direction is preferably in a range from 16 mm to 32 mm, more preferably from 24 mm to 28 mm. In the case where the width of the grip 30*a* in the up-down direction is in a range from 30 mm to 60 mm, the width of the throttle lever 32 in the up-down direction is preferably in a range from 40% to 80%, more preferably from 60% to 70%, of the grip 30*a*. A front surface 32*a* of the throttle lever 32 has a curved shape on the fore end bulging toward a central portion of the up-down direction. The curved shape is substantially an arc shape curved in a rotation direction of the throttle lever 32. Furthermore, the front surface 32*a* of the throttle lever 32 has a curved shape on the fore end bulging toward the central portion from both left and right sides.

An upper surface 32*b* of the throttle lever 32 has a curved shape depressed downward (inward). An anti-slip uneven portion is provided to the upper surface 32*b*. Similarly, a lower surface 32*c* of the throttle lever 32 has a curved shape depressed upward (inward). An anti-slip uneven portion is also provided to the lower surface 32*c*.

A stop switch 33 is provided to a right side portion of the grip 30*a* in the fore end portion of the arm 30. Pressing the stop switch 33 stops the engine 23 from operating.

Operations of the backpack blower 10 having the configuration above are described. When the backpack blower 10 is not in use, the arm 30 is retracted in a retracted position (indicated by a dashed-two dotted line in FIG. 2) perpendicularly upward (inclined at 45° forward with respect to the support axis 31*b*). In this state, the arm 30 stands without falling outward from the backpack frame 11 due to the torsion spring 31*e* of the hinge 31. From this state, the worker dons the backpack frame 11 after the engine 23 starts, lightly holds the grip 30*a* in the fore end portion of the arm 30 with the left hand, and rotates the grip 30*a* obliquely forward left. Specifically, the worker rotates the arm 30 outward around the axis line of the support axis 31*b*, which is provided at 45° obliquely rearward from the perpendicular direction, and concurrently rotates the arm 30 downward around the horizontal axis line of the left-right direction. Thus, the arm 30 retracted in the retracted position is rotated obliquely forward left to an operation position by one rotation operation. From this state, the worker holds the grip handle 25 of the blower tube 24 with the right hand, rotates the throttle lever 32 while holding the arm 30 with the left hand, directs an outlet on a fore end of the blower tube 24 at the ground, and discharges air to blow away fallen leaves scattered on the ground.

In the backpack blower 10 having the configuration above, the hinge 31 supporting the arm 30 is provided to the lower front portion of the left side portion of the backpack frame 11 and the arm 30 is supported by the support axis 31*b* of the hinge 31 so as to be rotatable around the axis line of the support axis 31*b*. Accordingly, with reference to FIG. 4(*b*), the arm 30 can be rotated outward from the backpack frame 11, thus allowing the worker to hold the arm 30 in a comfortable posture without closing off the left side of the body. In the present embodiment, the support axis 31*b* of the hinge 31 is provided at 45° obliquely rearward from the perpendicular direction. The arm 30 can be rotated outward from the backpack frame 11 within a range from the up-down direction to the front-rear direction.

The support axis 31*b* of the hinge 31 is fixed at the predetermined angle of 45° obliquely rearward from the perpendicular direction. In a case where the support axis 31*b* of the hinge 31 is provided perpendicularly, the grip 30*a* in the fore end portion of the arm 30 is proximate to the axis line of the support axis 31*b* when the arm 30 is perpendicularly upward in the retracted position (indicated by the dashed-two dotted line in FIG. 2). Thus, the arm 30 is difficult to rotate outward around the axis line of the support axis 31*b* unless the arm 30 is rotated forward around the horizontal axis line of the left-right direction such that the grip 30*a* of the arm 30 is brought away from the axis line of the support axis 31*b*. Thus, two rotation operations are required. With the support axis 31*b* of the hinge 31 provided at the predetermined angle of 45° obliquely rearward from the perpendicular direction, the grip 30*a* in the fore end portion of the arm 30 is already positioned somewhat away from the axis line of the support axis 31*b* when the arm 30 is perpendicularly upward in the retracted position. Thus, the arm 30 can be rotated forward and outward in one operation. In the present embodiment, the support axis 31*b* of the hinge 31 is provided at 45° obliquely rearward from the perpendicular direction. The present invention, however, is not limited to this angle, and the support axis 31*b* of the hinge 31 may be provided at an angle in a range from 30° to 60°, preferably from 40° to 50°, obliquely rearward from the perpendicular direction.

Furthermore, the arm 30 is supported by the hinge 31 so as to be rotatable between the backpack frame 11 side and the outer side away from the backpack frame 11. The torsion spring 31*e* is provided to the hinge 31, which is fixated to the lower portion of the backpack frame 11, the torsion spring 31 urging the arm 30 toward the backpack frame 11. Thus, when the backpack blower 10 is not in use, the arm 30 can be stowed along the backpack frame 11 and can be stored compactly in a storage location.

In addition, the arm 30 is fixated to the movable portion 31*c* of the hinge 31 and is rotatably supported by the rotation axis 31*b* via the movable portion 31*c* and the rubber anti-vibration member 31*d*. Thus, vibration generated by the engine 23 is prevented from being transmitted to the arm 30 via the backpack frame 11. Accordingly, the worker becomes less tired from holding the arm 30.

The backpack blower (backpack work machine) 10 has the backpack frame 11, which the worker carries on the back; the engine (motor) 23 of the blower unit 20 mounted on the backpack frame 11; the blower unit (driven device) 20 driven by the engine 23; and the arm 30 attached to the lower portion of the backpack frame 11 so as to be rotatable around the axis line of the left-right direction and having in the fore end portion the throttle lever 32, which regulates the output of the engine 23. In the backpack blower 10, the throttle lever 32 is a block-shaped body supported by the grip 30a in the fore end portion of the arm 30 so as to be rotatable around the horizontal axis line. The width of the throttle lever 32 in the up-down direction is 62% of the width of the fore end portion of the arm 30 in the up-down direction. Thus, the worker can rotate the throttle lever 32 while holding the grip 30a in the fore end portion of the arm 30 in various ways, such as, for example, rotating the throttle lever 32 while pressing the flat of the thumb against the front surface 32a, rotating the throttle lever 32 while holding it between the thumb and index finger, and rotating the throttle lever 32 with the palm while holding the fore end portion of the arm 30 with the fingers. Thus, even when a specific finger is fatigued or the worker feels tired of working with the arm 30 held in the same way, the worker can vary how to hold the arm 30 to rotate the throttle lever 32. Accordingly, operation performance of the throttle lever 32 is improved. When the width of the throttle lever 32 in the up-down direction is in a range from 40% to 80%, preferably from 60% to 70%, of the width of the grip 30a in the up-down direction, the operation performance of the throttle lever 32 is improved, as described above.

The front surface 32a of the throttle lever 32 has a curved shape on the fore end bulging toward the central portion of the up-down direction. Furthermore, the front surface 32a of the throttle lever 32 has a curved shape on the fore end bulging toward the central portion from both left and right sides. Thus, when the throttle lever 32 is rotated with the palm while the fore end portion of the arm 30 is held with the fingers, fit to the palm is excellent.

The upper surface 32b and the lower surface 32c of the throttle lever 32 each have a curved shape depressed inward. Thus, when the upper surface 32b of the throttle lever 32 is pressed downward with the thumb or when the lower surface 32c is pressed upward with the index finger, grip of the throttle lever 32 is excellent and thus the operation performance is improved. In addition, the anti-slip uneven portions provided on the upper surface 32b and the lower surface 32c of the throttle lever 32 provide better grip of the throttle lever 32, and thus improve the operation performance. Alternatively, at least one of the upper surface 32b and the lower surface 32c of the throttle lever 32 may have the curved shape depressed inward. Similarly, at least one of the upper surface 32b and the lower surface 32c of the throttle lever 32 may have the anti-slip uneven portion.

Figure 5:
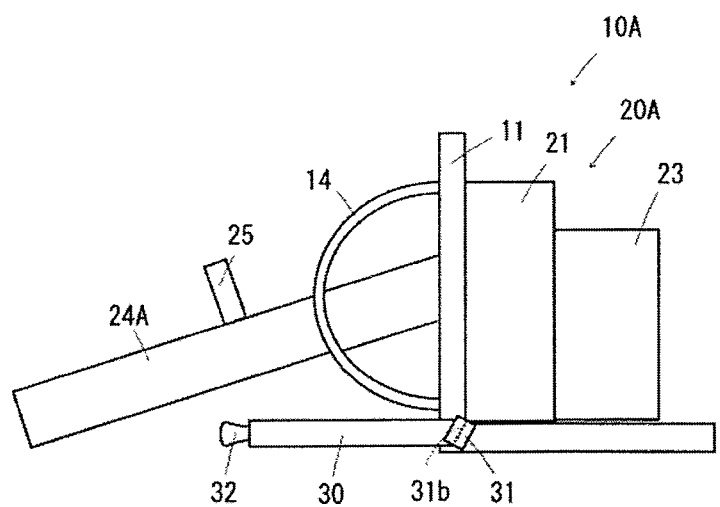
FIG. 5 is a schematic view of a backpack dust collector according to an alternative embodiment of the backpack work machine of the present invention.
Figure 6:
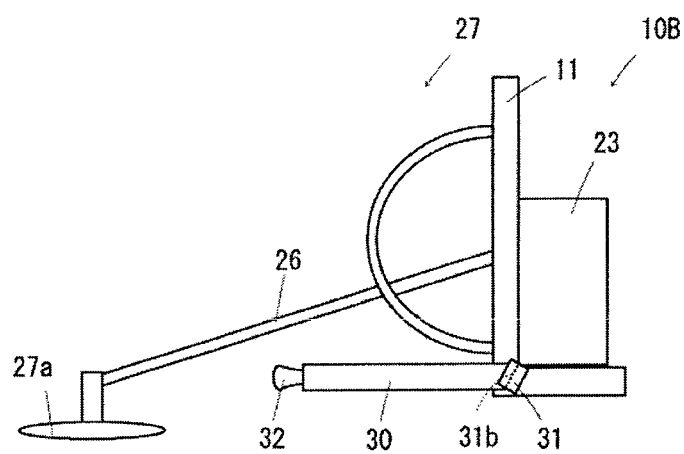
FIG. 6 is a schematic view of a backpack brushcutter according to an alternative embodiment of the backpack work machine of the present invention.

In the embodiment above, the backpack blower 10 is described as the backpack work machine. The present invention, however, is not limited to the embodiment above. With reference to FIGS. 5 and 6, the backpack work machine is also applicable to a backpack dust collector 10A, a backpack brushcutter 10B, and the like. Specifically, the backpack dust collector 10A has the backpack frame 11, which a worker carries on the back; the engine (motor) 23 mounted on the backpack frame 11; a dust collecting unit (driven device) 20A driven by the engine 23 and vacuuming air through a dust collecting tube 24A; and the arm 30 provided to the lower portion of the backpack frame 11 and having in the fore end portion the throttle lever 32 regulating the output of the engine 23.

Similarly, the backpack brushcutter 10B has the backpack frame 11, which a worker carries on the back; the engine 23 mounted on the backpack frame 11; a cutter (driven device) 27 driven by the engine (motor) 23 and having a cutting blade 27a rotationally driven via a power transmission shaft provided to an operating rod 26; and the arm 30 provided to the lower portion of the backpack frame 11 so as to be rotatable around the axis line of the left-right direction and having in the fore end portion the throttle lever 32 regulating the output of the engine 23.

In the backpack dust collector 10A and the backpack brushcutter 10B as well, the support axis 31b is fixedly provided to the lower portion of the backpack frame 11, the support axis 31b having the axis line direction range from the up-down direction to the front-rear direction, and the arm 30 is supported by the support axis 31b so as to be rotatable around the axis line thereof. In the backpack dust collector 10A and the backpack brushcutter 10B as well, main configurations, including the arm 30, the hinge 31, and the throttle lever 32, are similar to those in the backpack blower 10. Thus, similar functions and effects to the backpack blower 10 are achieved.

In the embodiments above, the engine 23 is used as the motor, but the present invention is not limited to this. An electric motor driven by a power source, such as a battery, may be used instead.

In the embodiments above, the arm 30 is provided to the lower front portion of the left side portion of the backpack frame 11. The present invention, however, is not limited to this. The arm 30 may be provided to the lower front portion of the right side portion of the backpack frame 11. In this case, with the hinge 31, the arm 30 is rotatable by 90° to the right. Similar functions and effects to the above can be achieved as well.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:
1. A backpack work machine comprising:
a backpack frame configured to be secured to a back of a worker;
a motor mounted on the backpack frame;
a driven device driven by the motor; and
an arm provided at a lower portion of the backpack frame, the arm being rotatable around an axis line that extends in a left-right direction of the backpack frame and having in a fore end portion thereof a throttle lever regulating output of the motor, wherein the backpack frame has in the lower portion thereof a support axis having a linear axis line, and the arm is supported by the support axis so as to be rotatable around the axis line of the support axis within a rotation range that extends between an up-down direction of the backpack frame and a front-rear direction of the backpack frame.

2. The backpack work machine according to claim 1, wherein the support axis is provided at a predetermined angle obliquely rearward from a retracted position of the arm in the up-down direction.

3. The backpack work machine according to claim 2, wherein the support axis is provided at an angle in a range from 30° to 60° obliquely rearward from the retracted position of the arm in the up-down direction.

4. The backpack work machine according to claim 3, wherein the support axis is provided at an angle in a range from 40° to 50° obliquely rearward from the retracted position of the arm in the up-down direction.

5. The backpack work machine according to claim 3, wherein the arm is supported by the support axis so as to be rotatable between a backpack frame side and an outer side away from the backpack frame, and a spring member is provided at the lower portion of the backpack frame and urges the arm toward the backpack frame.

6. The backpack work machine according to claim 3, wherein the arm is rotatably supported by the support axis via an anti-vibration member composed of a flexible elastic member.

7. The backpack work machine according to claim 3, wherein the throttle lever is a block-shaped body supported by the fore end portion of the arm so as to be rotatable around a horizontal axis line extending in the fore end portion of the arm, and a width of the throttle lever in the up-down direction is in a range from 40% to 80% of a width of the fore end portion of the arm in the up-down direction.

8. The backpack work machine according to claim 2, wherein the arm is supported by the support axis so as to be rotatable between a backpack frame side and an outer side away from the backpack frame, and a spring member is provided at the lower portion of the backpack frame and urges the arm toward the backpack frame.

9. The backpack work machine according to claim 2, wherein the arm is rotatably supported by the support axis via an anti-vibration member composed of a flexible elastic member.

10. The backpack work machine according to claim 2, wherein the throttle lever is a block-shaped body supported by the fore end portion of the arm so as to be rotatable around a horizontal axis line extending in the fore end portion of the arm, and a width of the throttle lever in the up-down direction is in a range from 40% to 80% of a width of the fore end portion of the arm in the up-down direction.

11. The backpack work machine according to claim 1, wherein the arm is supported by the support axis so as to be rotatable between a backpack frame side and an outer side away from the backpack frame, and a spring member is provided at the lower portion of the backpack frame and urges the arm toward the backpack frame.

12. The backpack work machine according to claim 11, wherein the arm is rotatably supported by the support axis via an anti-vibration member composed of a flexible elastic member.

13. The backpack work machine according to claim 11, wherein the throttle lever is a block-shaped body supported by the fore end portion of the arm so as to be rotatable around a horizontal axis line extending in the fore end portion of the arm, and a width of the throttle lever in the up-down direction is in a range from 40% to 80% of a width of the fore end portion of the arm in the up-down direction.

14. The backpack work machine according to claim 1, wherein the arm is rotatably supported by the support axis via an anti-vibration member composed of a flexible elastic member.

15. The backpack work machine according to claim 1, wherein the throttle lever is a block-shaped body supported by the fore end portion of the arm so as to be rotatable around a horizontal axis line in the fore end portion of the arm, and a width of the throttle lever in the up-down direction is in a range from 40% to 80% of a width of the fore end portion of the arm in the up-down direction.

16. The backpack work machine according to claim 15, wherein a front surface of the throttle lever has a curved shape on a fore end portion thereof such that the throttle lever bulges at a central portion thereof in the up-down direction.

17. The backpack work machine according to claim 15, wherein a front surface of the throttle lever has a curved shape on a fore end portion thereof such that the throttle lever bulges at a central portion thereof in the left-right direction.

18. The backpack work machine according to claim 15, wherein at least one of an upper surface and a lower surface of the throttle lever has a curved shape depressed inward in the up-down direction.

19. The backpack work machine according to claim 15, wherein at least one of the upper surface and the lower surface of the throttle lever has an anti-slip uneven portion.

20. The backpack work machine according to claim 15, wherein the width of the throttle lever in the up-down direction is in a range from 60% to 70% of the width of the fore end portion of the arm in the up-down direction.

* * * * *